(No Model.)

F. D. HAKE.
BOUQUET SUPPORT AND FORMER.

No. 254,006. Patented Feb. 21, 1882.

Witnesses:
E. G. Asmus
Henry Lovinson

Inventor:
Franz D. Hake,
By Stout & Underwood,
Attorneys

UNITED STATES PATENT OFFICE.

FRANZ D. HAKE, OF MILWAUKEE, WISCONSIN.

BOUQUET SUPPORT AND FORMER.

SPECIFICATION forming part of Letters Patent No. 254,006, dated February 21, 1882.

Application filed September 19, 1881. (No model.)

*To all whom it may concern:*

Be it known that I, FRANZ D. HAKE, of Milwaukee, in the county of Milwaukee, and in the State of Wisconsin, have invented certain new and useful Improvements in Bouquet Supports and Formers; and I do hereby declare that the following is a full, clear, and exact description thereof.

My invention consists in the novel construction of my bouquet support and former, as will be more fully set forth hereinafter.

Figure 1:
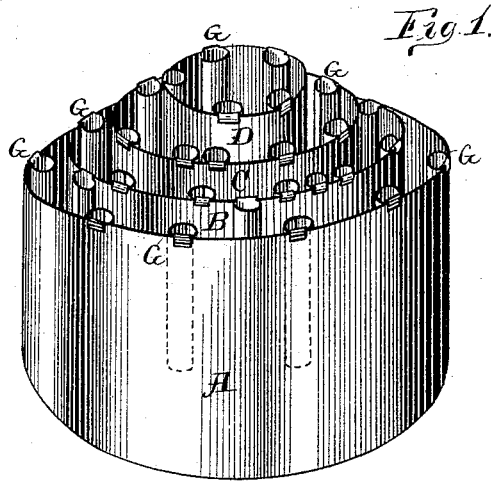
Figure 2:
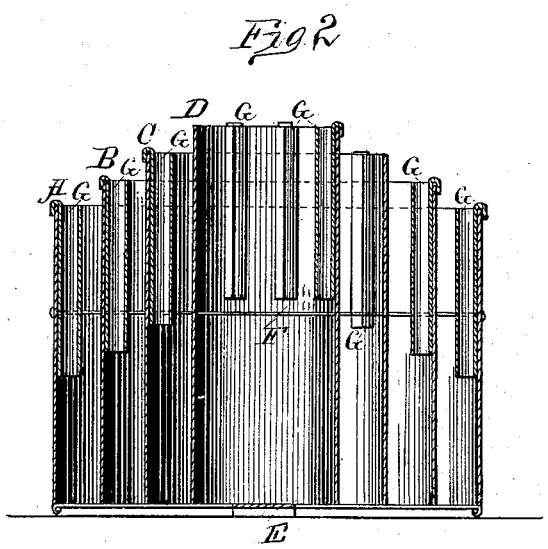
Figure 3:
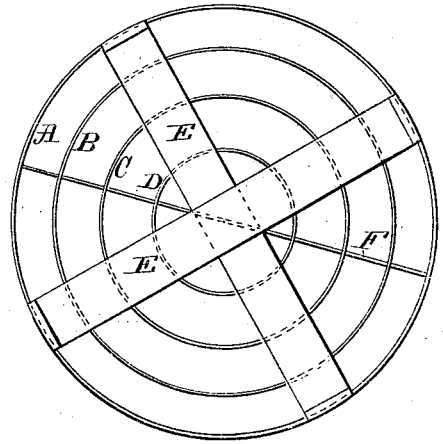

In the drawings, Figure 1 represents my improved device in perspective. Fig. 2 is a vertical central section of the same, and Fig. 3 is an under side plan view.

Heretofore in forming bouquets or putting together clusters of flowers various disadvantages have manifested themselves which this invention is intended to avoid. Bouquets are generally formed by taking the flowers into one's hands, building up the bouquet gradually from one side toward the center, and again toward the opposite side. This requires a great deal of skill and close attention. It is difficult to so place the flowers from the first as to secure symmetry, and the position of the flowers frequently requires considerable changing before the bouquet is finished, thereby entailing loss of time and more or less injury to the flowers from repeated handling.

My invention enables the putting together and building up of a bouquet in its various parts simultaneously, placing the more prominent objects originally in the positions they are intended to occupy and afterward filling in the minor decorative matter, saving much time and avoiding injury to the flowers by frequent changing and handling, besides possessing other advantages, which will be more fully specified hereinafter.

My device, in the form selected for illustration, consists primarily of any reasonable number of concentric vertical cylinders, located one within the other, and having a common center, as represented in the drawings, where I have shown four, (marked A, B, C, and D.) The outer cylinder, A, has the least height and the central cylinder, D, the greatest height of them all, while the other cylinders are of such relative heights that the whole forms a stepped cone, whereby the diameters of the several cylinders decrease inversely as their height increases toward the center. The space between each cylinder is preferably about the same, though the question of proportion does not affect the essence of my invention, nor does the shape of the cylinders, though I have shown them circular as the form preferred. The cylinders are secured together, as by flat cross-strips E E, at the bottom, to which the base of each cylinder may be soldered, and they are strengthened in position, preferably by a fine wire rod, F, passing diametrically through them at about half the height of the center cylinder, and the cylinders may also be soldered to this wire, at every point of contact, to render the whole firm and stable.

G G G represent the stem-holders for the principal flowers of the bouquets. These are preferably made of single strips of tin, bent so as to form long open cylinders, flattened at one side, and with a portion of the tin bent over to form a hook, as shown in the drawings. These holders are hung by their hooks on the cylinders A, B, C, and D, and the latter may have a beaded upper edge, if desired, to facilitate the movements of the holders thereon. Various modifications of these holders will readily suggest themselves, and it is only essential that a vertical cylinder be provided, open at top and bottom, to securely hold the stem, together with an overlapping hook, strip, or spring, to support the holder on the edge of one of the large concentric cylinders described.

The operation of my device is very simple, yet extremely effective. The gardener or florist wishing to make a bouquet selects a bouquet-former of the desired size and shape, and going directly to the growing flowers cuts off, say, a rose, camelia, or other prominent flower, and places it directly in the stem-holder, and so proceeds until he has placed in position all the prominent flowers of the bouquet, it being understood that the stem-holders vary in their diameters to suit the stems of different flowers—that for a calla, for instance, being much larger than that for a rose; and for the principal center flower, if such be desired, the stem-holder may project up above the whole, and have three or four hooks from its center, so as to rest securely upon the middle cylinder, D. The more conspicuous objects and prominent flowers being selected and placed in the former, their arrangement in the bouquet may be altered, if necessary, without again touching either the flowers or their stems, as the stem-holders may be crowded together or pushed farther apart, or a stem-holder with its flower may be lifted bodily out of place and transferred to a different position on the cylinder or moved to another cylinder without the slightest handling of the flowers, which handling, from their known delicacy, is always attended with the risk of injuring them. The spaces between the concentric cylinders can then be filled with green leaves and other minor decorative objects—such as small flowers and the like—and the bouquet is completed without the disadvantages of handling over the flowers or of keeping them in the hand while arranging them. Another great advantage of my invention lies in the fact that, whereas some flowers wither much sooner than others, the stem-holder containing the withered flower can be lifted from its position without disturbing the balance of the bouquet, a fresh flower substituted for that faded, and the holder replaced in its former position. In this way a bouquet may be kept fresh and beautiful for a long time, instead of being wholly spoiled by the withering of one or two of the prominent and more perishable flowers. Furthermore, I avoid tightly wiring or tying the flowers together, which is always injurious. When the bouquet is completed it is intended to place it in a suitable vase or basket containing water or wet sand; and my device is to be made in assorted sizes and shapes, so as to fit within any desired style of vase, pot, basket, or other receptacle. To adapt it for tall vases it may be necessary to support it upon a standard or extension; but all these minor details of construction are obvious and unimportant, not affecting the essence of the invention.

Having thus described my invention, what I claim as new, and desire to secure by Letters Patent, is—

1. The bouquet support and former described, consisting of a number of concentric vertical cylinders of different heights and diameters, secured together and provided with movable stem-holders adapted to be supported by the upper edges of the cylinders and to move laterally thereon, as and for the purpose set forth.

2. In a bouquet support and former, the series of concentric cylinders arranged in the form of a stepped cone, secured together and provided with movable stem-holders adapted to be supported by the upper edges of the cylinders and to move laterally thereon, as and for the purpose set forth.

In testimony that I claim the foregoing I have hereunto set my hand this 14th day of September, 1881

FRANZ D. HAKE.

Witnesses:
 STANLEY S. STOUT,
 HAROLD G. UNDERWOOD.